(12) United States Patent
Lu et al.

(10) Patent No.: US 6,409,227 B1
(45) Date of Patent: Jun. 25, 2002

(54) FAST ROTATION JOINT

(76) Inventors: Wen Hua Lu; Tzu-Chuan Tien, both of No. 7-8, Niu Pu Tsu, Tan Shui Jen, Taipei Hsien (TW)

( * ) Notice: Subject to any disclaimer, the term of this patent is extended or adjusted under 35 U.S.C. 154(b) by 0 days.

(21) Appl. No.: 09/741,186

(22) Filed: Dec. 21, 2000

(51) Int. Cl.⁷ .................................................. F16L 27/00
(52) U.S. Cl. ..................................... 285/276; 285/281
(58) Field of Search ................................ 285/276, 280, 285/281, 95

(56) References Cited

U.S. PATENT DOCUMENTS

| | | | |
|---|---|---|---|
| 961,170 A | * | 6/1910 | Shotwell ...................... 285/281 |
| 2,176,323 A | * | 10/1939 | Bowen et al. .............. 285/281 |
| 2,421,974 A | * | 6/1947 | Vandervoort ................ 285/281 |
| 2,509,090 A | * | 5/1950 | Faccou ........................ 285/281 |
| 2,833,568 A | * | 5/1958 | Corsette ...................... 285/281 |
| 3,099,466 A | * | 7/1963 | Kreidel ........................ 285/281 |
| 4,272,108 A | * | 6/1981 | Maasberg .................... 285/281 |
| 4,500,119 A | * | 2/1985 | Geberth ....................... 285/276 |
| 4,647,079 A | * | 3/1987 | Ohlsson ....................... 285/281 |
| 4,817,996 A | * | 4/1989 | Fouts .......................... 285/276 |
| 5,222,486 A | * | 6/1993 | Vaughn ....................... 285/281 |
| 5,366,261 A | * | 11/1994 | Ohmi et al. ................ 285/281 |

* cited by examiner

Primary Examiner—Eric K. Nicholson
(74) Attorney, Agent, or Firm—Rosenberg, Klein & Lee

(57) ABSTRACT

A fast rotation joint is disclosed. The fast rotation joint is engaged between a machine body and a joint of the transferring flexible tube. The fast rotation joint includes mainly a first main body, a second main body, and a third main body. A drain-preventing pad is illustrated between the first main body and the second main body. The drain-preventing pad is used to prevent air from drainage so that the pressure will be insufficient. A plurality of rollers are mounted between the second main body and the third main body for preventing the deformation from the engagement of the machine body with the transferring flexible tube so as to increase the lifetime of the transferring flexible tube and the joint.

9 Claims, 6 Drawing Sheets

FAST ROTATION JOINT

FIELD OF THE INVENTION

The present invention relates to a fast rotation joint, and especially to a fast rotation joint engaged between an air machine body and a joint of a transferring flexible tube.

BACKGROUND OF THE INVENTION

In the general used air machine, such as air guns, pneumatic spanners, pneumatic openers, painting guns, etc., air is compressed by an air compressor, and then the compressed air is transferred to the air machine. Since the machine and transferring flexible tube thereof are combined as an integral body, as the user moves the machine to a place for operation, the transferring flexible tube is easy to deform to be pulled. Moreover, the air within the transferring flexible tube is compressed to have a higher pressure, thus, a deformed transferring flexible tube will have a reduced lifetime.

Therefore, the prior art joint substantially has the effect of reducing lifetime and thus, is necessary to be improved.

SUMMARY OF THE INVENTION

Accordingly, the primary object of the present invention is to provide a fast rotation joint, wherein a drain-preventing pad is used to prevent air from drainage so that the pressure will be insufficient. A plurality of rollers are mounted between the second main body and the third main body for preventing the deformation from the engagement of the machine body and transferring flexible tube so as to increase the lifetime of the transferring flexible tube and the joint. Thus, a fast rotation joint with a simple structure is formed.

To achieve the above object, the present invention provides a fast rotation joint is disclosed. The fast rotation joint is engaged between a machine body and a joint of the transferring flexible tube. The fast rotation joint includes mainly a first main body, a second main body, and a third main body. A drain-preventing pad is illustrated between the first main body and the second main body. The drain-preventing pad is used to prevent air from drainage so that the pressure will be insufficient. A plurality of rollers are mounted between the second main body and the third main body for preventing the deformation from the engagement of the machine body and transferring flexible tube so as to increase the lifetime of the transferring flexible tube and the joint.

The various objects and advantages of the present invention will be more readily understood from the following detailed description when read in conjunction with the appended drawing.

DETAILED DESCRIPTION OF THE PREFERRED EMBODIMENTS

Figure 1:
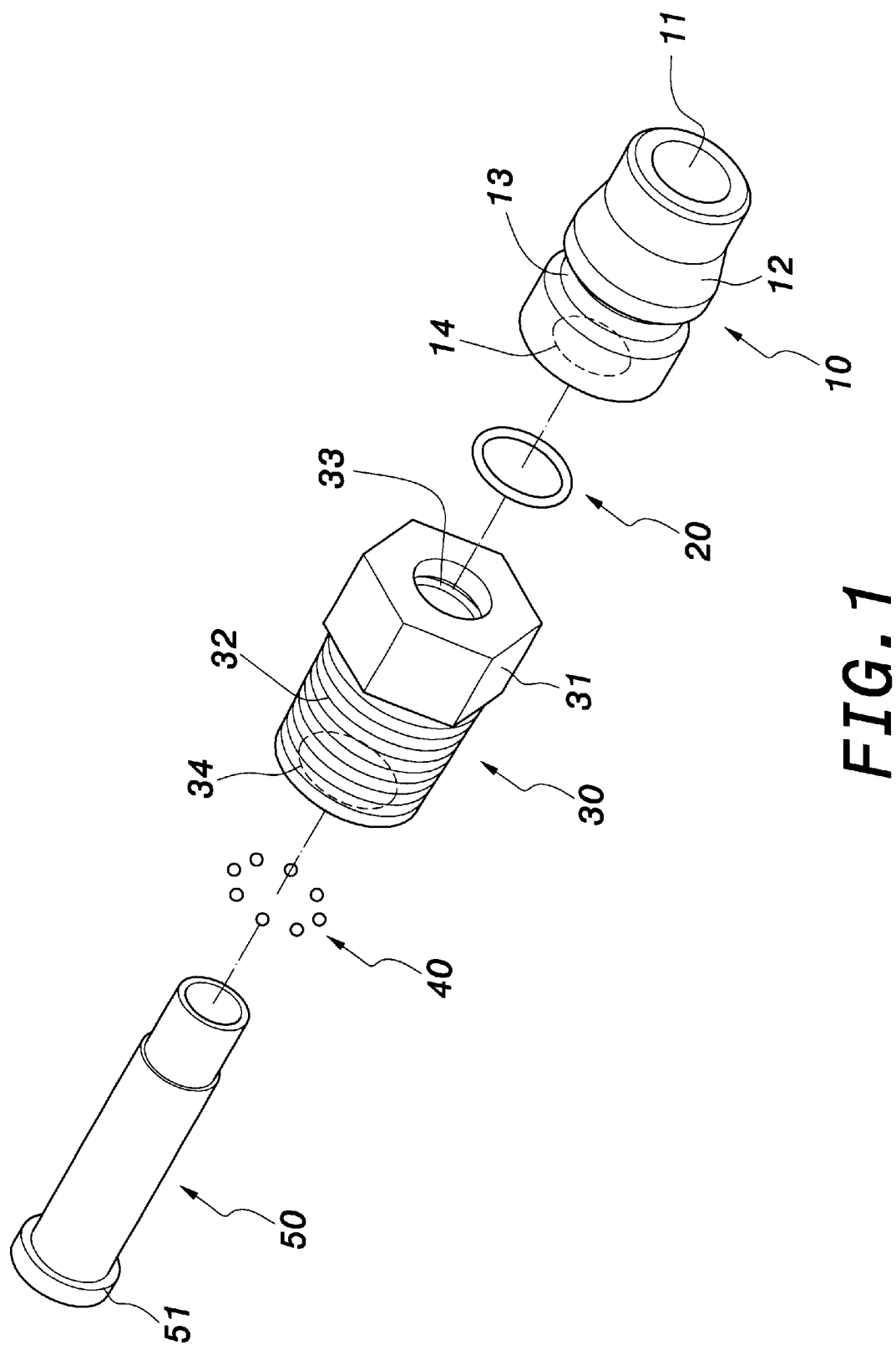
FIG. 1 is an exploded perspective view the present invention.

Referring to FIGS. 1 to 5, a fast rotation joint of the present invention is illustrated. The fast rotation joint of the present invention is especially used between a machine body 100 and a joint 112 of a transferring flexible tube 111. The fast rotation joint has a first main body 10 with a hollow inner part. A center at the front lateral surface of the first main body 10 is installed with a round opening 11. A surface of the first main body 10 is extended with an inclined surface 12 by which the joint 112 of the transferring flexible tube 111 can be connected easily. A rear side of the inclined surface 12 is extended with a groove 13. A center of the rear side of the first main body 10 has a round opening 14. The round opening 14 can be passed through. The first main body 10 is connected to the second main body 30. The second main body 30 has a hollow inner part. The front end of the rear side of the second main body 30 are installed with openings 33 and 34. A drain-preventing pad 20 serves to isolate the first main body 10 from the second main body 30. The drain-preventing pad 20 is made of rubber. The drain-preventing pad 20 substantially prevents the drainage of air. The front side of the second main body 30 is installed with a hexagonal head 31. The hexagonal head 31 is conformable to a hexagonal spanner. The rear side of the hexagonal head 31 is extended with thread 32. The opening 34 at the rear side of the second main body 30 is passed through by the third main body 50. The third main body 50 may pass to the second main body 30 and is connected with the first main body 10 and the drain-preventing pad 20. A plurality of rollers 40 are installed between the second main body 30 and the third main body 50. The rollers 40 is helpful to the rotation of the third main body 50 in the second main body 30. The third main body 50 has a hollow shape. The rear side of the third main body 50 extends with a flange 51.

Figure 2:
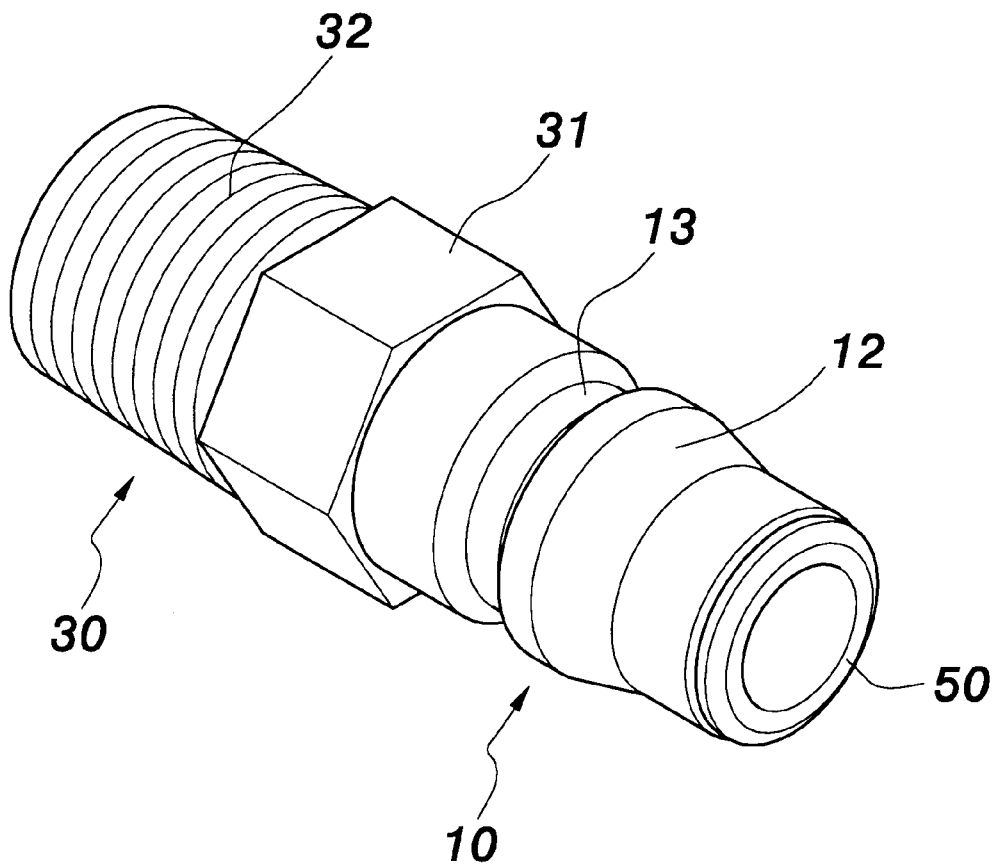
FIG. 2 is an assembled view of the present invention.
Figure 3:
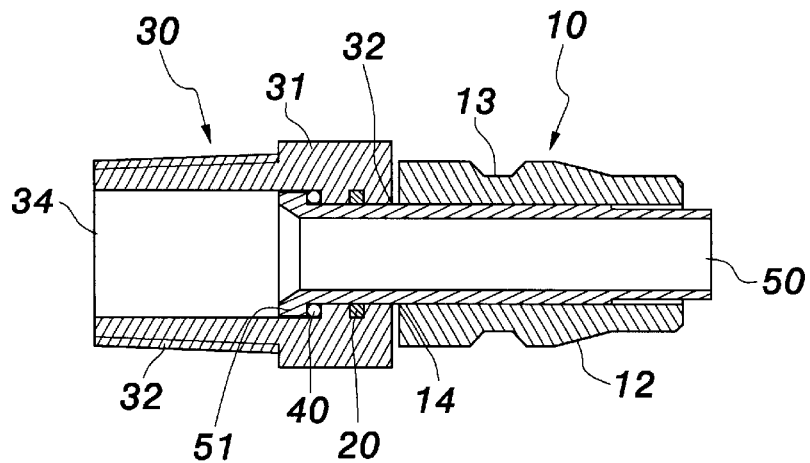
FIG. 3 is a schematic view of the present invention.
Figure 4:
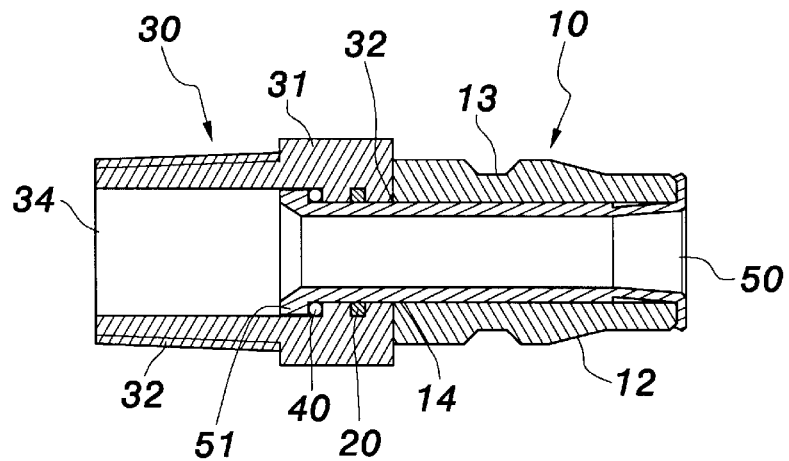
FIG. 4 is another schematic view of the present invention.

Referring to FIGS. 1, 2 and 3, as the parts of the present invention are desired to the assembled. At first, the roller 40 is placed around the flange 51 at the rear surface of the third main body 50. Then, the third main body 50 mounted with rollers 40 passes through the openings 33, 34 and drain-preventing pad 20 on the centers of the front and rear sides of the second main body 30. Finally, the third main body 50 passes through the round opening 14 at the center of the rear surface of the first main body 10. Then, by punching by a punching machine, the first main body 10, drain-preventing pad 20, second main body 30, rollers 40, and third main body 50 are combined as an integral body (referring to FIG. 4).

Figure 5:
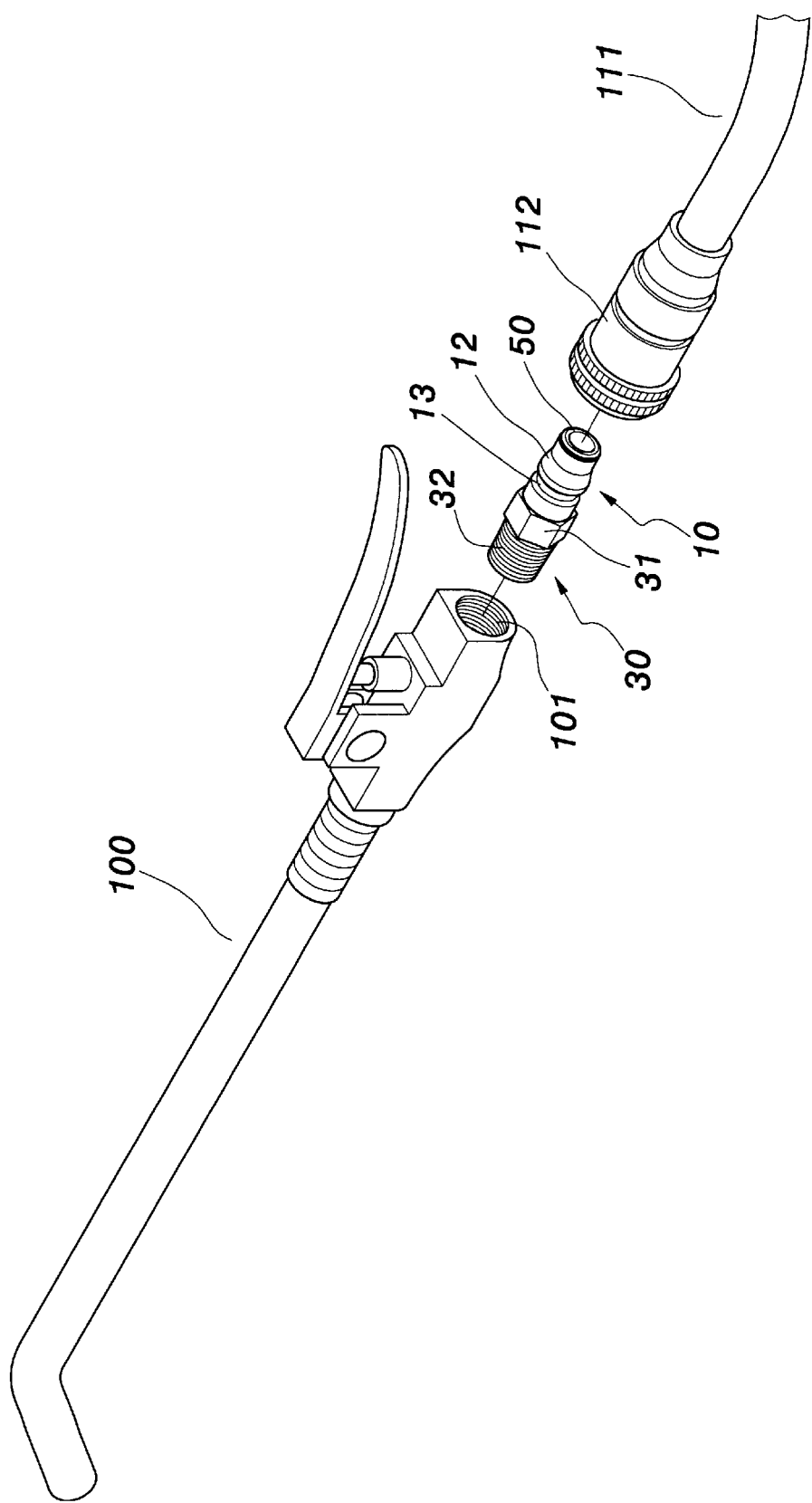
FIG. 5 is an assembled perspective view of the present invention.

Referring to FIG. 5, as the present invention is used to combine an air machine body 100 with the joint 112 of a transferring flexible tube 111. The thread at the extension of the rear side of punched and assembled second main body 30 is screwed to the thread 11 of the machine body 100. Then the hexagonal head 31 at the outer edge of the front side of the second main body 30 is retained tightly by a hexagonal spanner. Then the joint 112 of the transferring flexible tube 111 is engaged to the present invention. As such, the present invention is connected between the machine body 100 and the joint 112 of the transferring flexible tube 111, and thus the function of the machine body 100 can be used.

Figure 6:
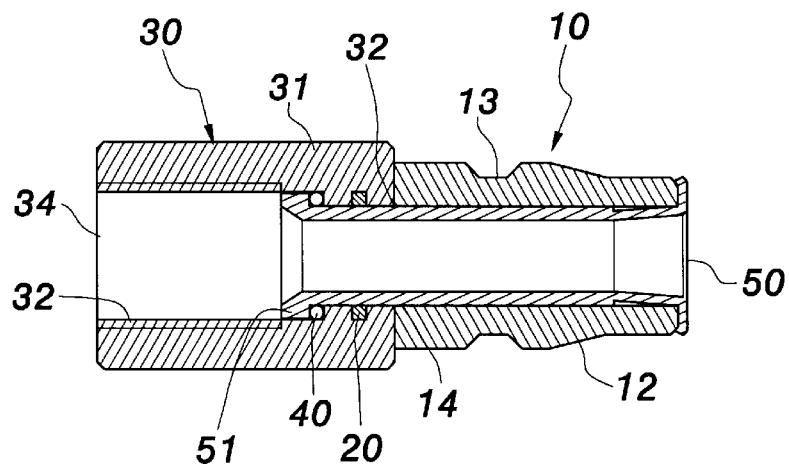
FIG. 6 shows a cross sectional view of another embodiment of the present invention.

Referring to FIG. 6, another embodiment of the present invention is illustrated. To successfully screw the thread, the thread 32 in the present invention may be mounted at the opening 34 on the rear side of the second main body 30 so that the user the machine body 2 may successfully screw with the screw thread.

Figure 7:
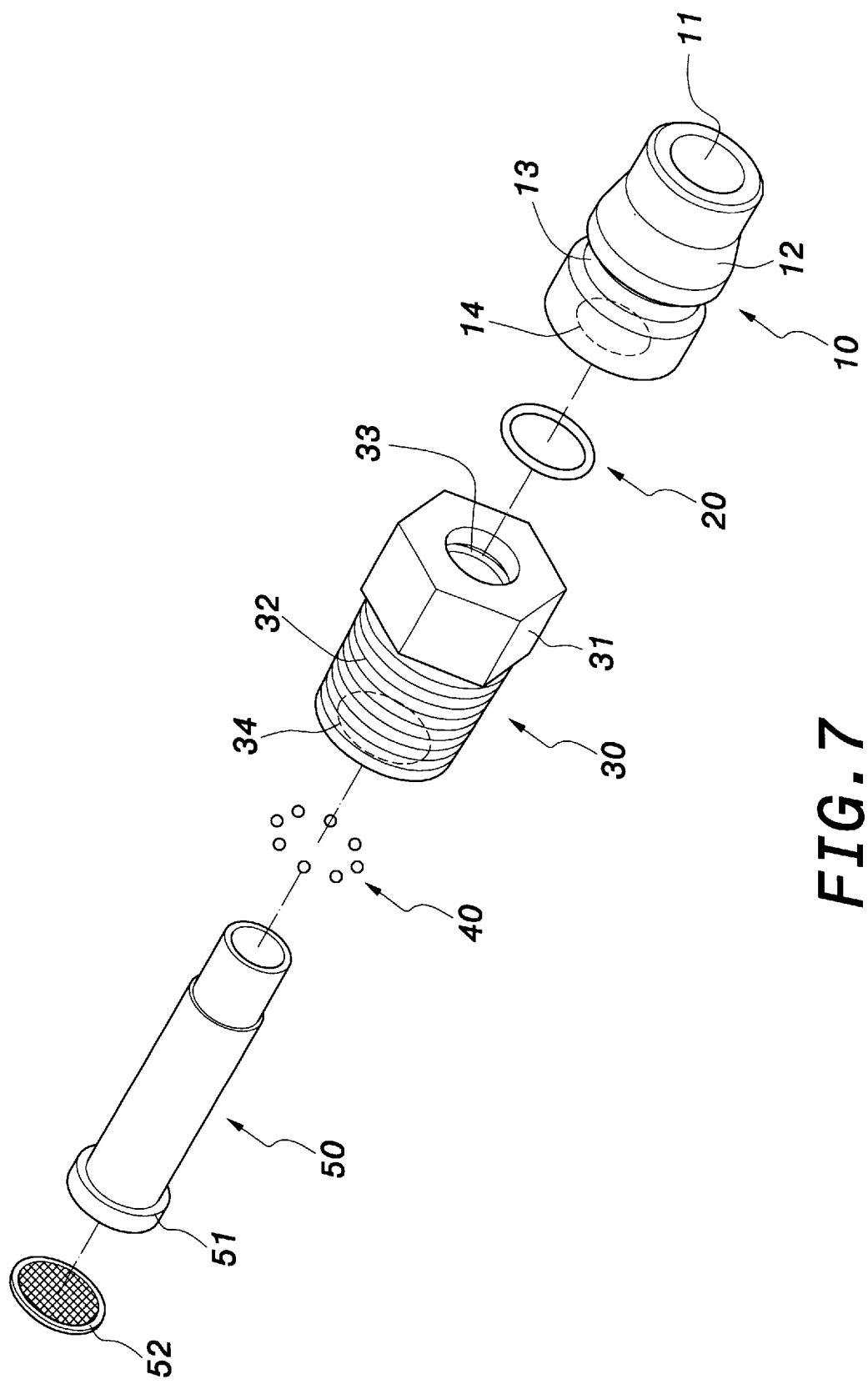
FIG. 7 is an exploded perspective view of a further embodiment of the present invention.
Figure 8:
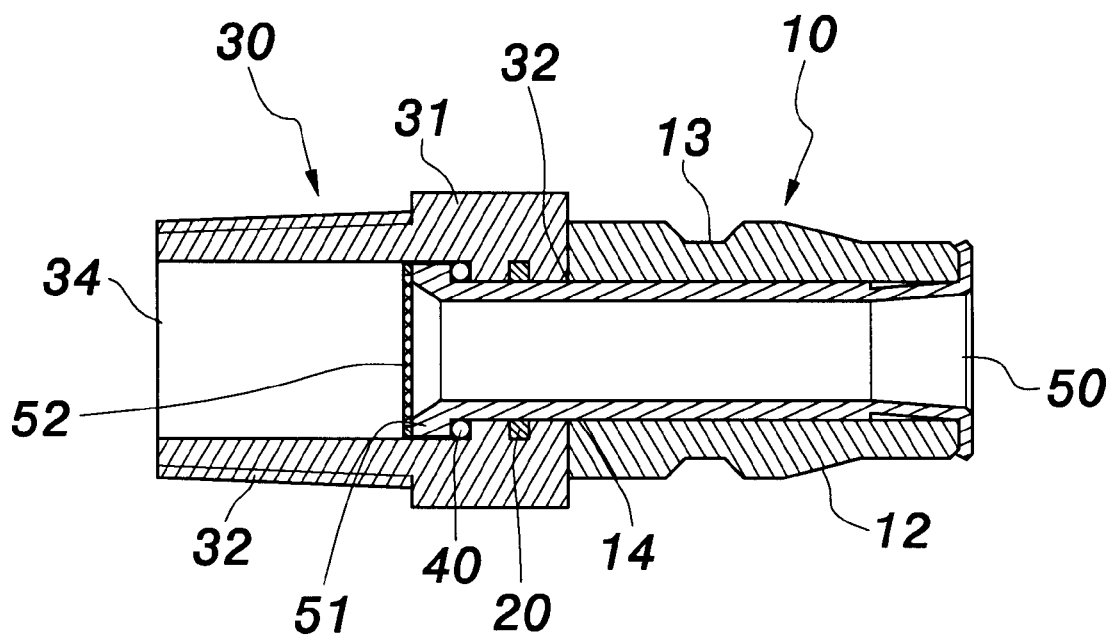
FIG. 8 is a cross sectional view of a further embodiment of the present invention.

Referring to FIGS. 7 and 8, a further embodiment of the present invention is illustrated, wherein the air in a fast rotation joint is cleaned for preventing the air in the soft tube 111 is blown out through a device 100 (referring to FIG. 5). Therefore, a filter net 52 can be arranged in the front edge of the third main body 50 to sustain a clean air. Other installation way and connecting method are identical to the aforesaid embodiment.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A fast rotation joint comprising:
   a first main body having a hollow inner portion and front and rear openings communicating therewith; an inclined surface extending thereon; a groove being formed at a rear end of the inclined surface;
   a second main body having a hollow inner portion, and front and rear openings communicating therewith; an outer edge thereof being formed with a hexagonal head; a threaded portion extending from the hexagonal head;
   a drain-preventing pad being connected between the rear opening of the first main body and the front opening of the second main body;
   a third main body passing through the first main body, second main body, and the drain-preventing pad; the third main body having a flange extended from a rear end thereof disposed within the second main body, the third main body having formed at a front end thereof a radially flared portion for axially retaining the first main body; and
   a plurality of rollers disposed between the second main body and the third main body.

2. The fast rotation joint as claimed in claim 1, wherein the first main body, second main body, third main body, drain-preventing pad, and rollers are integrated as an integral body by punching.

3. The fast rotation joint as claimed in claim 1, wherein the threaded portion includes a plurality of outer threads.

4. A fast rotation joint comprising:
   a first main body having a hollow inner portion and front and rear openings communicating therewith; an inclined surface extending thereon; a groove being formed at a rear end of the inclined surface;
   a second main body having a hollow inner portion, and front and rear openings communicating therewith; an outer edge thereof being formed with a hexagonal head; a threaded portion extending from the hexagonal head;
   a drain-preventing pad being connected between the rear opening of the first main body and the front opening of the second main body;
   a third main body having a flange extended from a rear side thereof and passing through the first main body, second main body, and the drain-preventing pad;
   a plurality of rollers disposed between the second main body and the third main body; and,
   a filtering net arranged in the third main body as a spacer.

5. The fast rotation joint as claimed in claim 1, wherein the threaded portion includes a plurality of inner threads.

6. The fast rotation joint as claimed in claim 1, wherein a filtering net is arranged in the third main body as a spacer.

7. The fast rotation joint as claimed in claim 4, wherein the first main body, second main body, third main body, drain-preventing pad, and rollers are integrated as an integral body by punching.

8. The fast rotation joint as claimed in claim 4, wherein the threaded portion includes a plurality of outer threads.

9. The fast rotation joint as claimed in claim 4, wherein the threaded portion includes a plurality of inner threads.

* * * * *